United States Patent
Di Meco et al.

(10) Patent No.: US 9,322,455 B2
(45) Date of Patent: Apr. 26, 2016

(54) TOOTHED BELT AND USE OF A TOOTHED BELT IN OIL

(75) Inventors: Marco Di Meco, Pescara (IT); Carlo Baldovino, Pescara (IT); Fabio Nardone, San Vito Chietino (IT); Licinia Licini, Ortona (IT)

(73) Assignee: DAYCO EUROPE S.R.L., Chieti (IT)

( * ) Notice: Subject to any disclaimer, the term of this patent is extended or adjusted under 35 U.S.C. 154(b) by 1156 days.

(21) Appl. No.: 13/263,268

(22) PCT Filed: Apr. 6, 2009

(86) PCT No.: PCT/IT2009/000148
§ 371 (c)(1),
(2), (4) Date: Feb. 29, 2012

(87) PCT Pub. No.: WO2010/116390
PCT Pub. Date: Oct. 14, 2010

(65) Prior Publication Data
US 2012/0157251 A1    Jun. 21, 2012

(51) Int. Cl.
F16H 57/04    (2010.01)
F16H 7/02    (2006.01)
F16G 1/06    (2006.01)
B32B 37/18    (2006.01)
F16G 1/28    (2006.01)

(52) U.S. Cl.
CPC ........................................ *F16G 1/28* (2013.01)

(58) Field of Classification Search
CPC ........................................................ F16G 1/28
USPC .................................... 474/91, 204, 205, 207
See application file for complete search history.

(56) References Cited

U.S. PATENT DOCUMENTS

| | | | |
|---|---|---|---|
| 2,699,685 A | 1/1955 | Waugh | |
| 4,678,455 A | 7/1987 | Holloway, Jr. | |
| 5,860,883 A | 1/1999 | Jonen | |
| 6,419,775 B1 * | 7/2002 | Gibson et al. | 156/137 |
| 6,739,997 B2 * | 5/2004 | Di Meco et al. | 474/260 |
| 7,749,118 B2 * | 7/2010 | Baldovino et al. | 474/205 |
| 7,985,152 B2 * | 7/2011 | Di Meco et al. | 474/205 |
| 2002/0128105 A1 | 9/2002 | Hedberg et al. | |

(Continued)

FOREIGN PATENT DOCUMENTS

| | | |
|---|---|---|
| EP | 2 000 702 A | 12/2008 |
| JP | 2002-147537 A | 5/2002 |

(Continued)

OTHER PUBLICATIONS

Office action issued by Japanese Patent Office for corresponding Japanese application 2012-504130 dated Aug. 27, 2013 with English translation.
Office Action (with English translation) issued Apr. 13, 2015 regarding Korean Patent Application No. 2011-7026361.

*Primary Examiner* — William E Dondero
*Assistant Examiner* — Mark K Buse
(74) *Attorney, Agent, or Firm* — Thompson Hine LLP

(57) ABSTRACT

There is described a belt comprising a body made of a first elastomeric material, in which a plurality of longitudinal filiform resistant inserts is embedded, and a working surface coated by a coating fabric, advantageously the working surface consists of a toothing. The first elastomeric material comprises fibers which extend in a direction substantially perpendicular to the resistant inserts and substantially parallel to a surface defined by the axes of the resistant inserts.

17 Claims, 6 Drawing Sheets

(56) References Cited

U.S. PATENT DOCUMENTS

| | | |
|---|---|---|
| 2004/0018906 A1 | 1/2004 | Sedlacek |
| 2007/0135251 A1* | 6/2007 | Di Meco et al. ............. 474/205 |
| 2007/0240658 A1* | 10/2007 | Baldovino et al. ......... 123/90.31 |
| 2009/0032177 A1* | 2/2009 | Takahashi et al. ............ 156/137 |
| 2010/0004082 A1* | 1/2010 | Di Meco et al. ............. 474/205 |
| 2011/0263367 A1* | 10/2011 | Baldovino et al. ........... 474/204 |
| 2012/0157251 A1* | 6/2012 | Di Meco et al. ................ 474/91 |

FOREIGN PATENT DOCUMENTS

| | | |
|---|---|---|
| JP | 2008-137342 A | 6/2009 |
| WO | WO 2004/057099 A | 7/2004 |
| WO | WO 2007/082920 A | 7/2007 |
| WO | WO 2009/034422 A | 3/2009 |

* cited by examiner

TOOTHED BELT AND USE OF A TOOTHED BELT IN OIL

This application is a 371 of PCT/IT2009/000148 filed on Apr. 6, 2009, published on Oct. 14, 2010 under publication number WO 2010/116390 A, the entire disclosure of which is incorporated herein by reference.

TECHNICAL FIELD

The present invention relates to a toothed drive belt and, in particular, to the use of a toothed belt in oil.

STATE OF THE ART

Toothed belts generally comprise an elastomeric body, in which are embedded a plurality of longitudinal filiform resistant inserts also designated as "cords" and a plurality of teeth coated by a coating fabric.

Each component of the belt contributes to increasing the performance in terms of mechanical resistance, so as to decrease the risk of failure of the belt and to increase the specific transmissible power.

The coating fabric of the belts increases the resistance to abrasion and hence protects the working surface of the belt from wear due to rubbing between the sides and the tops of the belt teeth and the sides and the bottoms of the races of the pulley with which the belt interacts.

Furthermore, the coating fabric reduces the coefficient of friction on the working surface, reduces the deformability of the teeth and especially reinforces the root of the tooth thereby avoiding the failure thereof.

Cords especially contribute to ensuring the required mechanical characteristics for the belt and substantially contribute to the modulus of the belt itself and specifically ensure the maintenance of the performance in the course of time. Cords are generally formed by twisting high-modulus fibres several times.

Cords are also normally treated with substances adapted to increase the compatibility of the fibres with the body compound that surrounds the cords themselves.

Finally, the body compound allows connecting the various above said elements and ensuring that the various elements forming the belt itself synergically contribute to the final performance of the belt itself.

The body compounds contain one or more elastomeric materials possibly enriched with fibres to increase the hardness thereof.

In some recent engines, the belts are however used in oil i.e. in systems in which the belt is inside the block and therefore is in direct contact with oil splashes or even always operates partially immersed in oil.

In this case, the materials of the drive belts used in "dry conditions" and which have therefore been designed to resist oil only for a short time and at low temperatures, do not allow to avoid absorption of the oil and therefore the swelling of the compound itself, that causes a deterioration of the mechanical features and may therefore give rise to broken teeth and accordingly may shorten the average life of the belt.

In particular, it is therefore fundamental for the body compounds, which must resist in oil even at high temperatures, to avoid or at least reduce absorption of the oil as well as to maintain a good resistance to abrasion.

Furthermore, in systems in which the belt is used in direct contact or partially immersed in oil, the engine oil is often contaminated by fuel. In particular, the contamination with fuel that mixes with oil even in high percentages thus diluting the oil itself and attacking the materials forming the belt, is detrimental.

For instance, in some applications oil is mixed and may even comprise up to 30% fuel. The percentage of fuel varies according to the operative conditions of the engine and is higher with a high load and low temperature of the engine.

As is known, fuel also contains many additives which may damage the compounds by which toothed belts are generally manufactured.

OBJECT OF THE INVENTION

It is a first object of the present invention to therefore obtain a toothed belt that has a long life and therefore excellent mechanical, adhesion, meshing precision and acoustic emission features.

A further object of the present invention is therefore to obtain a toothed belt capable of having at the same time high resistance to abrasion and therefore to wear and a low noise level both at high and low speeds and in the whole range of operating temperature of the belt.

A further object of the present invention is therefore to obtain a toothed belt capable of resisting in direct contact with oil or partially immersed in oil at a high temperature.

A further object of the present invention is to avoid or reduce the swelling of the belt when used in direct contact, i.e. in the presence of constant fuel-mixed oil splashes or partially immersed in fuel-mixed oil.

A further object of the present invention is therefore to obtain a body compound reducing swelling in fuel-mixed oil at a high temperature.

A further object of the present invention is to obtain a drive system comprising a toothed belt and means to maintain the toothed belt in direct contact with fuel-mixed oil or partially immersed in fuel-mixed oil, in which the toothed belt has a low swelling after 200 hours of operation in fuel-mixed oil.

Finally a further object of the present invention is to obtain a method for manufacturing a simple toothed belt capable of facilitating the orientation of the fibres in the belt.

According to the present invention, this object is achieved by a toothed belt that has alternating transverse teeth and grooves forming a toothing, a body made of a first elastomeric material, and the toothing coated by a fabric and a plurality of longitudinal resistant inserts embedded in the body of the belt. The first elastomeric material comprises fibres having a length in a range between 0.5 mm and 2 mm, which extend in a direction substantially perpendicular to said resistant inserts and substantially parallel to a surface defined by the axes of said resistant inserts. The fibres are distributed throughout the first elastomeric material from a back side of the toothed belt to the toothing of the toothed belt. The toothed belt is adapted to be used in a fuel-mixed oil (a mixture of oil with fuel) with the fuel being more than 30% of the mixture, and swells less than 2% of its initial width from absorption of oil after 200 hours of operation in the fuel-mixed oil.

According to the present invention a drive system is also provided that includes a toothed belt as disclosed herein.

According to the present invention a process is also provided for the manufacture of such toothed belts.

BRIEF DESCRIPTION OF THE DRAWINGS

For a better understanding of the present invention, it is now also described with reference to the accompanying figures, in which.

DESCRIPTION OF THE INVENTION

Hereinafter, the expression "the elastomeric material substantially consists" means that the elastomeric material may comprise small percentages of other polymers or copolymers, which may be added to the elastomeric material without varying the physical-chemical features of the compound and therefore without departing from the scope of the present invention.

Hereinafter, the expression "additive for elastomeric material" means any material that is added to the elastomeric material to vary the physical-chemical features thereof.

Use "in oil" means that the belt is used partially immersed in an oil bath or is in direct contact with oil, generally the belt in use is within the engine block, for instance as a replacement of chain or gear systems.

Use "in dry conditions" means that the belts are outside the engine block and are only accidentally in contact with the engine oil and are not generally in contact with fuel-mixed oil.

Use "in fuel-mixed oil" means that the toothed belt is used in a mixture of oil with fuel in percentages even over 30%.

Figure 1:
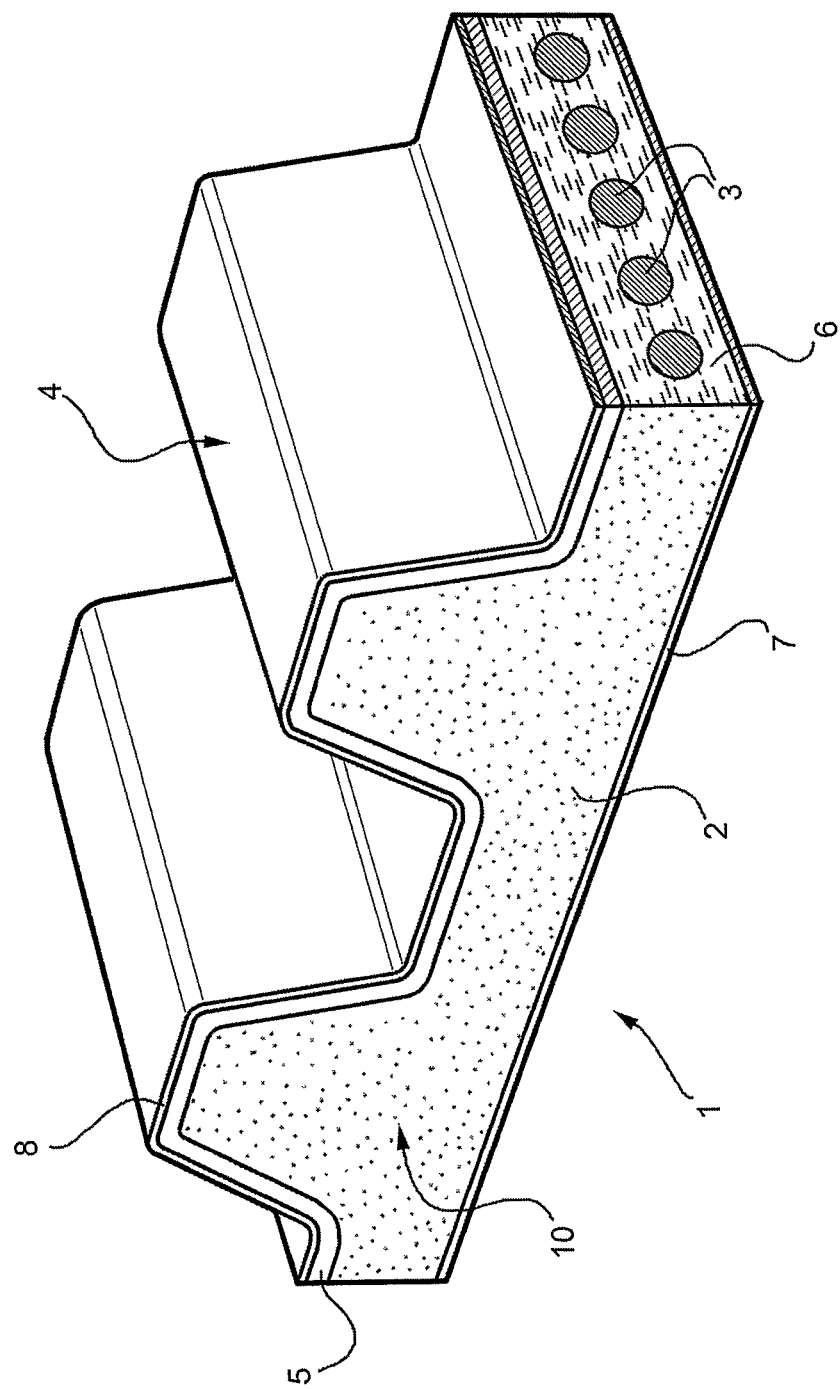
FIG. 1 is a partial perspective view of a toothed belt according to the present invention.

FIG. 1 shows a toothed belt 1 as a whole. Belt 1 comprises a body 2 made of elastomeric material, in which a plurality of longitudinal filiform resistant inserts 3 is imbedded.

Body 2 has a toothing 4, which is coated by means of a coating fabric 5.

Advantageously, body 2 is made of a compound, also designated as body compound, that is formed by one or more elastomers.

The compound forming the body of the toothed belt according to the present invention comprises reinforcing fibres 6 which extend in a direction substantially perpendicular to the resistant inserts and substantially parallel to a surface defined by the axes of the resistant inserts as also shown in FIG. 1.

Fibres 6 are advantageously added in an amount between 1 and 40 phr, more advantageously between 10 and 30 phr for instance 20 phr.

Reinforcing fibres 6 advantageously have a length in the range between 0.1 and 10 mm.

Fibres 6 are advantageously selected from the group consisting of glass fibres, carbon fibres, polyamide fibres, aramidic fibres, polyester fibres, polyvinyl acetate fibres, PTFE, polyketone, PBO, PEEK, PPS, polyimides, cotton and mixtures thereof.

Fibres 6 advantageously have a length in the range between 0.1 and 10 mm. More advantageously, the fibres have a length in the range between 0.5 and 2 mm.

Advantageously, fibres 6 have an average diameter in the range between 0.1 and 50 µm, more advantageously between 1 and 20 µm, even more advantageously between 5 and 15 mm, for instance 12 µm.

Reinforcing fibres 6 are advantageously aromatic polyamides, more advantageously paramides, for example Technora© fibres, which may even be adhered to the compound, for instance by means of a resorcinol and formaldehyde latex (RFL) treatment or by epoxy resins, isocyanates or adhesives, may advantageously be used. For example, the latex used may comprise a vinylpyridine-styrene-butadiene copolymer (VP-SBR).

Aramidic fibres have shown to be especially effective, such as for example Teijn's 1 mm-long Technora fibres.

The use of fibres 6 allows to further increase the mechanical features of the compound forming the body and therefore the mechanical features of the toothed belt, thus reducing the swelling and therefore the broadening of the belt.

A toothed belt 1 according to the present invention is made by using the known manufacturing processes which are however modified to allow the arrangement of fibres 6 transversally to the direction of the resistant inserts.

According to the present invention the manufacturing process for the toothed belt comprises a step during which the compound loaded with fibres is passed through a calender so as to form a strip of material in which the fibres are arranged in the direction of calendering. The compound with fibres oriented in the direction of calendering is then collected on a roller.

Figure 5:
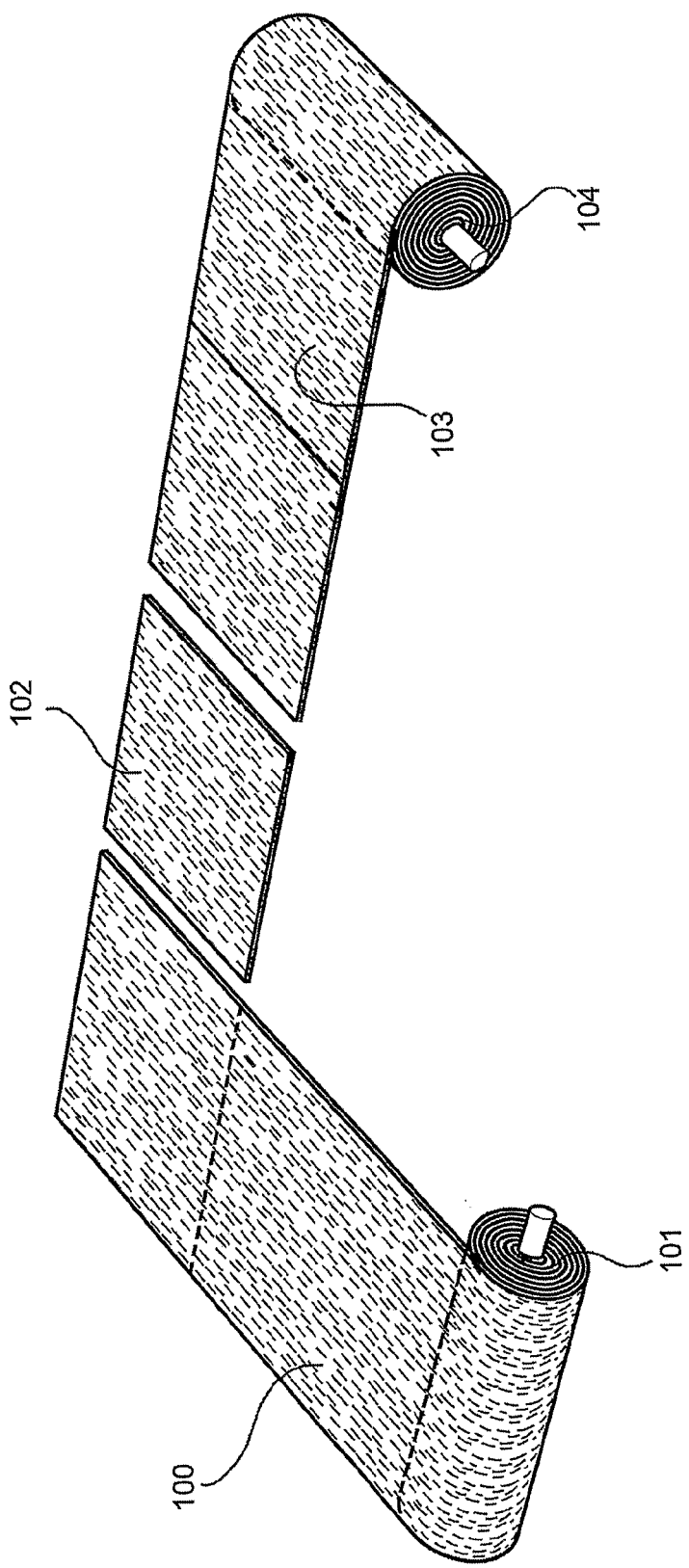
FIG. 5 is a diagrammatical representation of a processing step of the process for manufacturing a toothed belt according to the present invention.

Then, as shown in FIG. 5 strip 100 of compound is unwound by roller 101 and cut along a first direction and in approximately square portions 102. Subsequently, square portions 102 are joined in a second perpendicular direction so as to form a continuous strip 103, which is therefore wound on a second roller 104.

Second roller 104 therefore has the fibres in a direction perpendicular with respect to the unwinding direction. The elastomeric material unwound from the strip formed in the previous step is therefore arranged in the vulcanisation cylinder according to the known manufacturing process for the toothed belts. In the toothed belt, the fibres will however result arranged according to the present invention, i.e. in a direction substantially perpendicular to the resistant inserts and substantially parallel to a surface defined by the axes of the resistant inserts.

Advantageously, the body compound comprises one or more copolymers formed from a nitrile group-containing monomer and by a diene.

The nitrile group-containing monomers are advantageously in a percentage in the range between 34 and 60% in weight with respect to total final copolymers.

Hereinafter, all percentages relating to the units of acrylonitrile are to be intended as percentages in weight.

More advantageously, these are in the range between 34 and 53% in weight.

Even more advantageously, these are in the range between 49 and 51% in weight, for example 50% in weight.

More advantageously, the copolymer/s used are nitrile rubbers, advantageously acrylonitrile butadiene rubbers, known as NBR. Even more advantageously, these are hydrogenated acrylonitrile butadiene, known as HNBR or even XHNBR, i.e. carboxylated and hydrogenated acrylonitrile butadiene.

Advantageously, the HNBR used has a high degree of hydrogenation, for example so-called totally saturated HNBRs—thus having a residual percentage of double bonds of 0.9% at most—may be used, although HNBRs with a lower degree of unsaturation—such as for example HNBRs with a degree of saturation of 4% or 5.5%, so-called partially saturated HNBRs—may be used as an alternative.

Some examples of HNBR copolymers that may be used as body compound, but also in different treatments of the various components of the toothed belt, are copolymers included in the family of THERBAN produced by Lanxess, such as THERBAN 3407 with 34% of nitrile groups and a degree of hydrogenation of at most 0.9%, THERBAN 3406 with 34% of nitrile groups and a degree of unsaturation of at most 0.9%, THERBAN 3607 with 36% of nitrile groups and a degree of insaturation of at most 0.9%, THERBAN 3446 with 34% of nitrile groups and a degree of insaturation of at most 4%, THERBAN 3447 with 34% of nitrile groups and a degree of insaturation of at most 5.5%, THERBAN 3627 with 36% nitrile groups and a degree of unsaturation of at most 2%, THERBAN 3629 with 36% of nitrile groups and a degree of unsaturation of at most 2%, THERBAN 3907 with 39% of nitrile groups and a degree of unsaturation of at most 0.9%.

HNBRs produced by Nippon Zeon by the name ZETPOL may also be used as an alternative. In particular ZETPOL 2000 with 36% of nitrile groups and a degree of unsaturation of at most 0.9%, ZETPOL 2000L with 36% of nitrile groups and a degree of unsaturation of at most 0.9%, ZETPOL 2010 with 36% of nitrile groups and a degree of unsaturation of at most 4%, ZETPOL 2010L with 36% of nitrile groups and a degree of unsaturation of at most 4%, ZETPOL 2010H with 36% of nitrile groups and a degree of unsaturation of at most 4%, ZETPOL 2020 with 36% of nitrile groups and a degree of unsaturation of at most 5.5%, ZETPOL 2020L with 36% of nitrile groups and a degree of unsaturation of at most 5.5%.

A polymer formed by a mixture of one or more copolymers obtained from a diene monomer and a nitrile group-containing monomer is used even more advantageously. One or more of such copolymers are advantageously added with an acid or a salt of an unsaturated carboxylic acid.

The unsaturated carboxylic acid is more advantageously methacrylic or acrylic acid and said salt is a zinc salt of methacrylic or acrylic acid.

A zinc salt of methacrylate acid is even more advantageously used.

The zinc salt of methacrylate acid is even more preferably added in an amount in the range between 10 and 60%.

For example, elastomers are advantageously used which are sold by Zeon with the names: ZSC 1295, ZSC 2095, ZSC 2195, ZSC 2295, ZSC 2295L, ZSC 2295R and ZSC 2395.

ZSC 2095 is more advantageously used.

In particular, the previously cited HNBRs, i.e. ZETPOL and/or THERBAN may partially or totally be replaced with a ZSC that comprises an unsaturated carboxylic acid and a zinc oxide and/or with THERBAN ART which comprises a salt of the unsaturated carboxylic acid.

The compound in the first elastomeric material may contain other conventional additives such as, for example, reinforcing agents, fillers, pigments, stearic acid, accelerators, vulcanisation agents, antioxidants, activators, initiators, plasticisers, waxes, prevulcanisation inhibitors, anti-degrading agents, process oils and the like.

Advantageously, carbon black may be used as a filler, advantageously added in amounts in the range between 0 and 80 phr, more advantageously approximately 40 phr. Advantageously, reinforcing white fillers such as talc, calcium carbonate, silica and silicates are advantageously added in an amount in the range between 0 and 80 phr, advantageously approximately 40 phr. Silanes may also advantageously be used in an amount in the range between 0 and 5 phr.

Advantageously, zinc oxide and magnesium oxide are added in an amount advantageously in the range between 0 and 15 phr.

Advantageously, ester plasticisers such as trimellitates or ether esters are added in an amount advantageously in the range between 0 and 20 phr.

Vulcanisation coagents such as triallylcyanurates, organic or inorganic methacrylates such as metal salts are advantageously added in an amount advantageously in the range between 0 and 20 phr or organic peroxides such as for example isopropyl benzene peroxide in an amount advantageously in the range between 0 and 15 phr.

Coating fabric 5 of toothing 4 or the optional coating fabric of back 7 may comprise one or more layers and may be obtained by means of different weaving techniques, for example by means of the weaving technique known as 2×2 twill.

As an alternative, coating fabric 5 may be obtained according to weaving modes allowing to obtain at least one rough surface to improve mechanical adhesion.

Coating fabric 5 of the teeth advantageously comprises aliphatic or aromatic polyamide, more advantageously aromatic polyamide (aramid).

The fabric used advantageously has a composite structure consisting of a weave and a warp, in which the weave consists of weave threads each formed by an elastic thread as a core and by at least one pair of composite threads wound on the elastic thread, each composite thread comprises a high thermal and mechanical resistance thread and at least one covering thread wound on the high thermal and mechanical resistance thread. Each composite thread advantageously includes a high thermal and mechanical resistance thread and a pair of covering threads wound on the high thermal and mechanical resistance thread. The elastic thread is advantageously polyurethane. The high thermal and mechanical resistance thread is advantageously made of para-aromatic polyamide.

Fabric 5 is generally processed by a first treatment and a second treatment.

Advantageously, fabric 5 is processed by a first treatment with RFL.

Advantageously, fabric 5 is subjected to a second treatment comprising a fluorinated plastomer, for instance PTFE, and an elastomer, for instance a material similar to that used for the body compound.

Advantageously, one or more copolymers formed from a nitrile group-containing monomer and by a diene are used.

The nitrile group-containing monomers are advantageously in a percentage in the range between 34 and 60% with respect to total final copolymers.

More advantageously, these are 34 and 53% in weight.

Even more advantageously, these are in the range between 49 and 51% in weight.

More advantageously, the copolymer/s used are nitrile rubbers, advantageously acrylonitrile butadiene rubbers, known as NBR. Even more advantageously, these are hydrogenated acrylonitrile butadiene, known as HNBR or even XHNBR, i.e. carboxylated hydrogenated acrylonitrile butadiene rubbers.

By appropriately selecting the amounts of materials it is made of, the second treatment may form a covering layer which is distinct and separate from the fabric itself and is hereinafter also designated as resistant layer 8 and is of the type disclosed in EP1157813. Resistant layer 8 forms the working surface of the belt and therefore further increases resistance to wear and avoids absorption of oil.

Advantageously, the fluorinated plastomer is present in the resistant layer in a higher amount in phr than the sum of the fluorinated elastomer and the second elastomeric material.

The thickness of the resistant layer 8 is advantageously in the range between 0.03 mm and 0.2 mm.

Resistant layer 8 may be placed over fabric 5 in different manners. It is preferably placed by means of a calendaring step.

An adhesive material may be placed between fabric 5 and resistant layer 8 to improve the adhesion of resistant layer 8 on fabric 5.

Resistant layer 8 preferably has a weight in the range between 50 and 120 g/m$^2$ to ensure the required resistance.

The back of the toothed belt is also preferably covered by a coating fabric 5, which is preferably formed by aliphatic or aromatic polyamide, more preferably by a high thermal resistance and high toughness polyamide 6/6.

Coating fabric 8 of the back is preferably identical to the previous one.

Coating fabric 8 of the back is also preferably coated by a resistant layer. Even more preferably the resistant layer that covers the coating fabric of the back is identical to that covering the coating fabric 5 of the teeth.

Resistant inserts 3, also designated as resistant inserts, made of a material selected from the group consisting of glass fibres, aramidic fibres, carbon fibres, PBO fibres may advantageously be used. Furthermore, cords of the so-called "hybrid" type may also be used, i.e. comprising filaments made of different materials, advantageously selected among those previously mentioned.

The cord is preferably made of high modulus glass fibres, for instance in a 22.5 3×18 configuration.

The fibres forming the cord are preferably treated with an HNBR latex vulcanised with hydrosoluble peroxides by means of the process disclosed in patent WO2004057099 to Nippon Glass.

Therefore, the treatment preferably comprises a treatment liquid preferably consisting of an aqueous adhesive and therefore comprising more that 50% water, comprising an elastomeric material latex and a vulcanisation adjuvant agent.

The belts according to the present invention are specifically suitable to be used in systems in direct contact or partially immersed in oil. Specifically, optimal results have been achieved in the case in which the belt is used instead of the traditional gear or chain systems inside the block, systems in which the belt is exposed for its whole lifetime to a continuous contact with oil splashes or possibly even partially immersed in an oil bath.

In this case, the first and/or the second treatment are advantageously also carried out on back 7, when a coating fabric 5 of the back is present. In this case, treatment 8 allows to avoid the penetration of oil even on the side of back 7 of toothed belt 1 and results especially advantageous when toothed belt 1 is used in control systems in which back 7 of the belt is in contact with shoes or tensioners. As a matter a fact, in these systems oil remains interposed between the contact surface of the shoe or the tensioner with the belt and the back of the belt itself and therefore the penetration within the compound forming the body would be promoted.

Toothed belt 1 may preferably be treated on all outer surfaces and, in particular, on sides 10 where the body compound is more exposed to the attack of oil, with a swelling resistant rubber, for instance ENDURLAST (Lord registered trademark).

Figure 2:
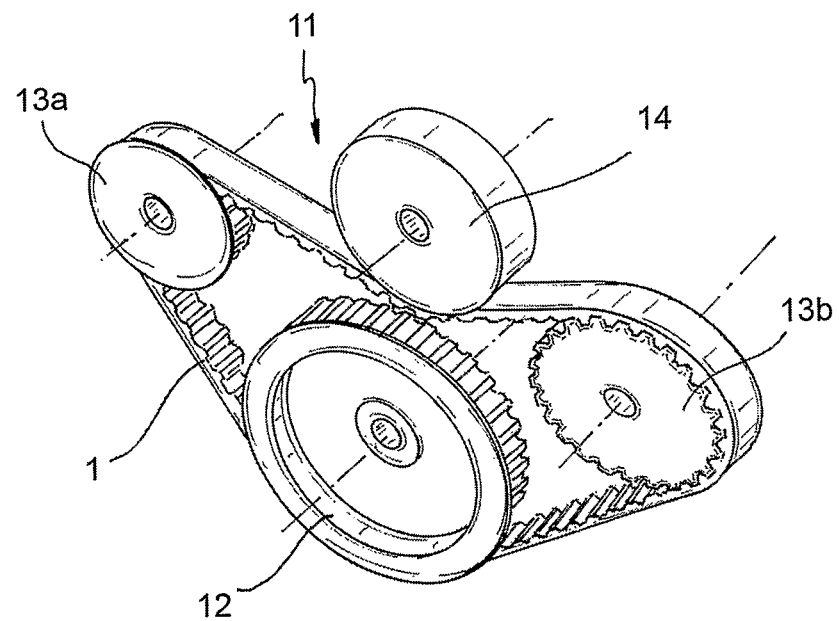
FIG. 2 is a diagram of a first timing control system using a first toothed belt according to the present invention.

Belt 1 according to the present invention may be used, for instance, in a timing control system for a motor vehicle of the type shown in FIG. 2. The timing control system is indicated in the Figure as a whole by numeral 11 and comprises a driving pulley 12 rigidly fixed to the drive shaft (not shown), a first and a second driven pulley (13a, 13b) and a tensioner 14 for the tensioning of the toothed belt.

Figure 3:
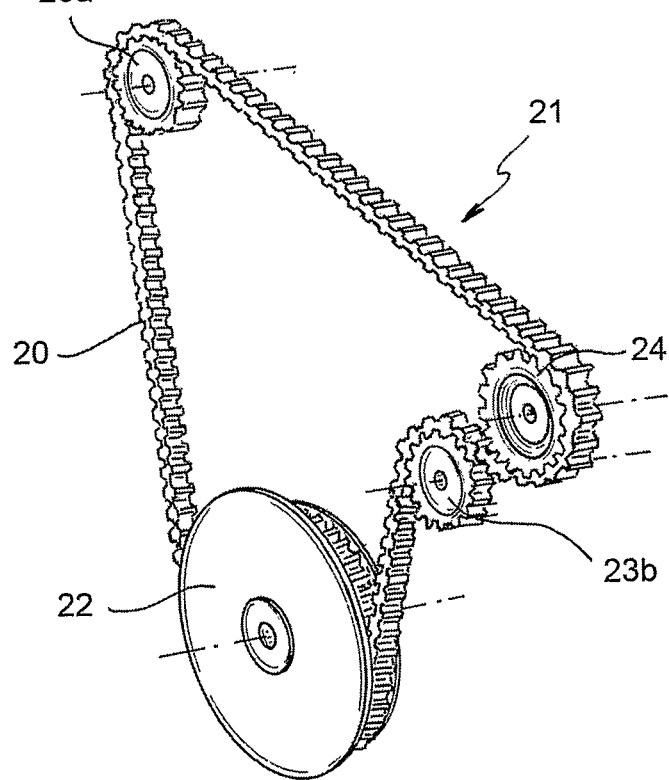
FIG. 3 is a diagram of a second timing control system using a second toothed belt according to the present invention.

According to a second alternative embodiment, shown in FIG. 3, numeral 20 shows a toothed belt according to the present invention, which has a toothing on both faces and therefore displays a resistant fabric that covers both toothings.

Toothed belt 20 may be used, for instance, in a timing control system for a motor vehicle of the type shown in FIG. 3. The timing control system is indicated in the Figure as a whole by numeral 21 and comprises a driving pulley 22 rigidly fixed to the drive shaft (not shown), a first, a second pulley and a third driven pulley (23a, 23b, 24).

Figure 4:
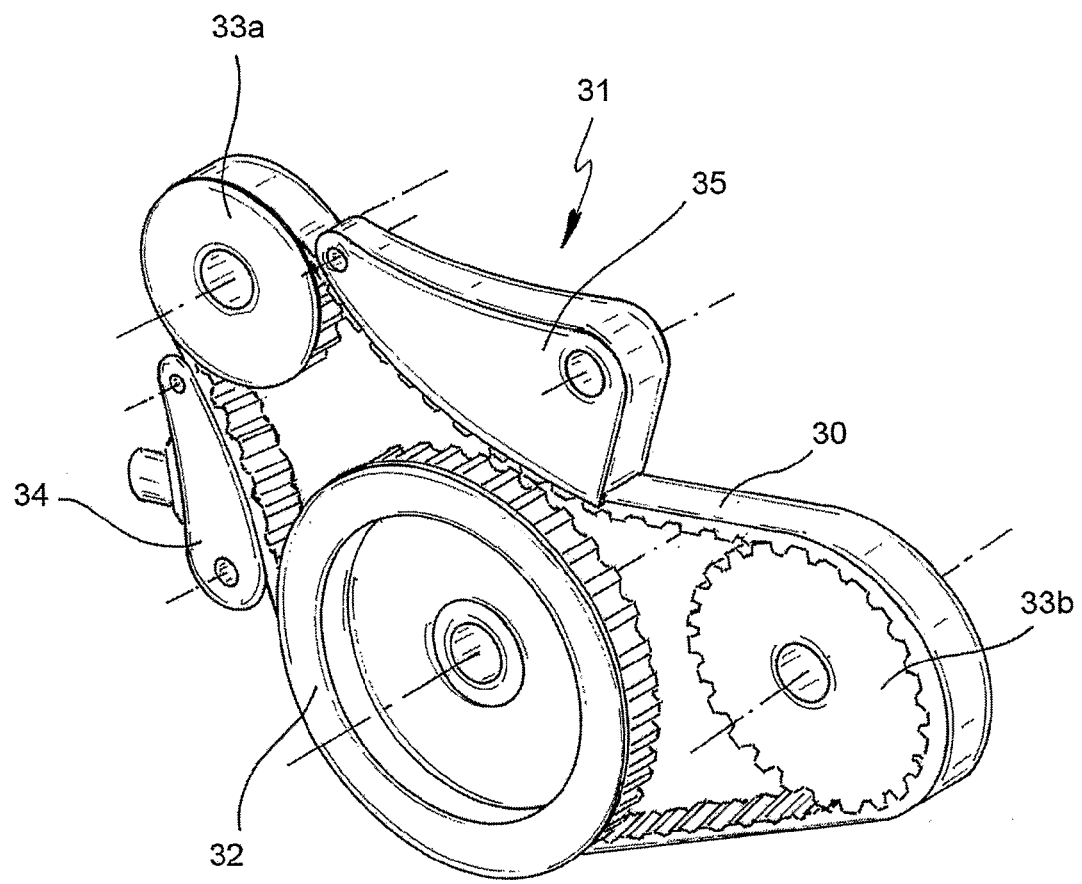
FIG. 4 is a diagram of a third timing control system using a third toothed belt according to the present invention.

According to a third embodiment of the present invention, shown in FIG. 4, a toothed belt 30 according to the present invention may advantageously be used in a timing control system shown as a whole as numeral 31 in the Figure and comprising a driving pulley 32 rigidly fixed to the drive shaft (not shown), a first and a second driven pulley (33a, 33b), a shoe tensioner 34 and a shoe 35.

In particular, the toothed belt of the present invention has been shown to be especially effective when used in a drive system commonly known as "balance shaft".

In use, toothed belts 1, 20 and 30 in respective control systems 11, 21 and 31 are in direct contact with the oil.

FIGS. 2 and 4 refer to control systems relative to the handling of balance countershafts, although it is clear that the toothed belt according to the present invention may also be used in so-called "cam to cam" systems or for the handling of the oil pump. In these cases, in use, the belt results partially immersed in an oil bath.

Furthermore, the belt according to the present invention may also be used in the main drive for the handling of the cams and also for the handling of the injection pump in diesel engines.

It has experimentally been verified that the arrangement of the fibres in a toothed belt according to the present invention allows to obtain an effective barrier to oil and therefore enables the tooth belts to pass the duration tests which they undergo for use in motor vehicles therefore avoiding all the problems of the toothed belts when used in contact with oil, in particular reduction of the mechanical characteristics, reduced adhesion, less efficient meshing and less resistance to wear.

It has also been verified that the use of a toothed belt according to the invention allows to reduce the swelling and therefore the broadening of the belt when it is used within the engine block in continuous contact with the fuel-mixed oil.

From an analysis of the characteristics of the toothed belt made according to the present invention, the advantages it allows to obtain are apparent.

In particular, it has surprisingly been found that, when the fibres of the body compound extend in a direction substantially perpendicular to the resistant inserts and substantially parallel to a surface defined by the axes of the resistant inserts, the resistance to wear of the belt is further improved and the toothed belt is capable of resisting the duration tests that simulate a duration of the belt of 250,000 km even when the belt is used in systems in direct contact or partially immersed in oil and at a high temperature. At the same time, during operation, the belt also has a low noise level both at high and low speeds and in the whole range of operating temperatures Furthermore, the belts according to the present invention have a very low swelling, in particular in the use in fuel-mixed oil.

While some embodiments have been disclosed by way of illustration of the invention, it is apparent that the skilled in the art may make modifications to the kind of fibres and to the materials forming it, as well as to the materials of the body compound and of the other components of the toothed belt without departing from the scope of the present invention. The toothed belt according to the present invention will now also be described by means of examples without because of this being limited thereby.

EXAMPLES

Standard belts have been tested. All belts comprise a body compound made of HNBR with 50% units of nitrile. The body compound is reinforced with 20 phr of reinforcement fibres in Teijn's 1 mm-long Technora fibres.

The fabric covering the toothing has a 2*2 twill configuration and a structure consisting of a weave and a warp, in which the weave consists of weave threads each formed by an elastic thread as a core and by one pair of composite threads wound on the elastic thread, each composite thread comprises a high thermal and mechanical resistance thread and at least one covering thread wound on the high thermal and mechanical resistance thread. Each composite thread advantageously includes a high thermal and mechanical resistance thread and a pair of covering threads wound on the high thermal and mechanical resistance thread. The elastic thread is made of polyurethane. The high thermal and mechanical resistance thread is made of para-aromatic polyamide. The fabric is subjected to a treatment with an HNBR spreading compound with 50% nitrile units and a PTFE according to the composition disclosed in EP1157813.

The cords are made of k glass.

The only difference in the tests between the standard belts and the belts according to the invention is in the orientation of the fibres of the body compound. Obviously, by using different materials for the body compound or for the manufacture of the other components of the belt, quantitatively different results may be obtained for the final broadening of the belt, but surprisingly in the case in which the fibres are arranged according to claim 1 a broadening of the belt is obtained in any case due to the lower absorption of the fuel-mixed oil with respect to that obtained when the fibres are arranged according to the known art i.e. longitudinally to the winding direction of the belt on the pulley.

The verification test of the swelling is carried out on the countershaft drive of the 2.0L AUDI FSI engine at 3000 rpm with 100% load carrying out test sessions of about 48 h after which the belt is extracted and the broadening thereof is measured, which provides a measurement of the amount of fuel-mixed oil absorbed on the belt.

Figure 7:
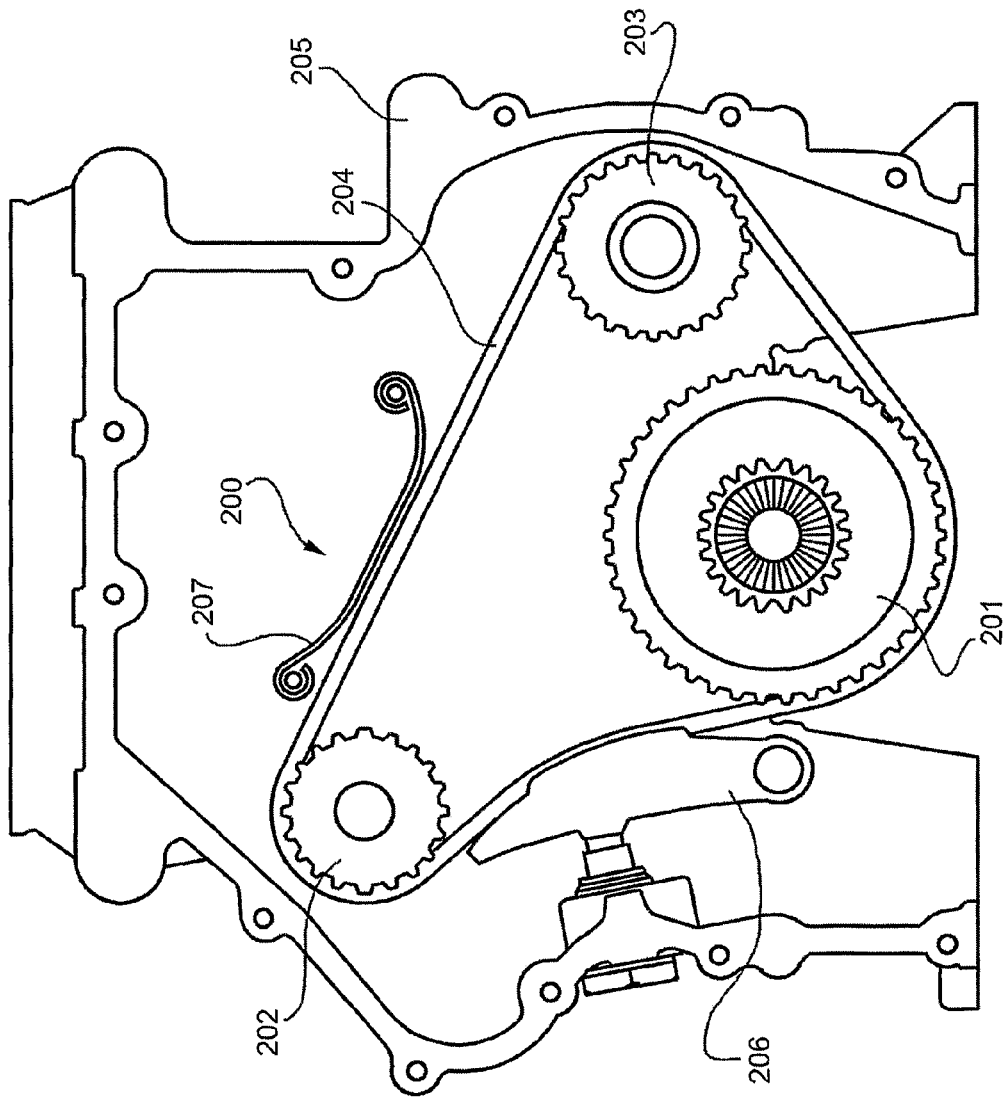
FIG. 7 is a drive system used in tests for measuring toothed belts according to the invention and according to the known art.

The drive system used is shown in FIG. 7 where it is indicated by number 200 and comprises a drive pulley 201, a countershaft pulley 202, a transmission pulley 203 and a toothed belt 204. The drive system is arranged within a block 205 and further comprises a shoe tensioner 206 and a spacer element 207.

The number of teeth of the pulleys which form the transmission system is shown in table 1.

| Drive | [n°] | 42 |
|---|---|---|
| 1$^{st}$ countershaft | [n°] | 21 |
| 2$^{nd}$ countershaft | [n°] | 24 |

The belt is known as 084ROL100 and is a belt with 84 teeth having an 8-mm step and a 10-mm width.

The temperature of the oil is 80° C. for the first 36 hours and then 120° C. for the subsequent 12 h for each test session. The amount of fuel was variable, but in any case even over 30% in some steps of the test.

Figure 6:
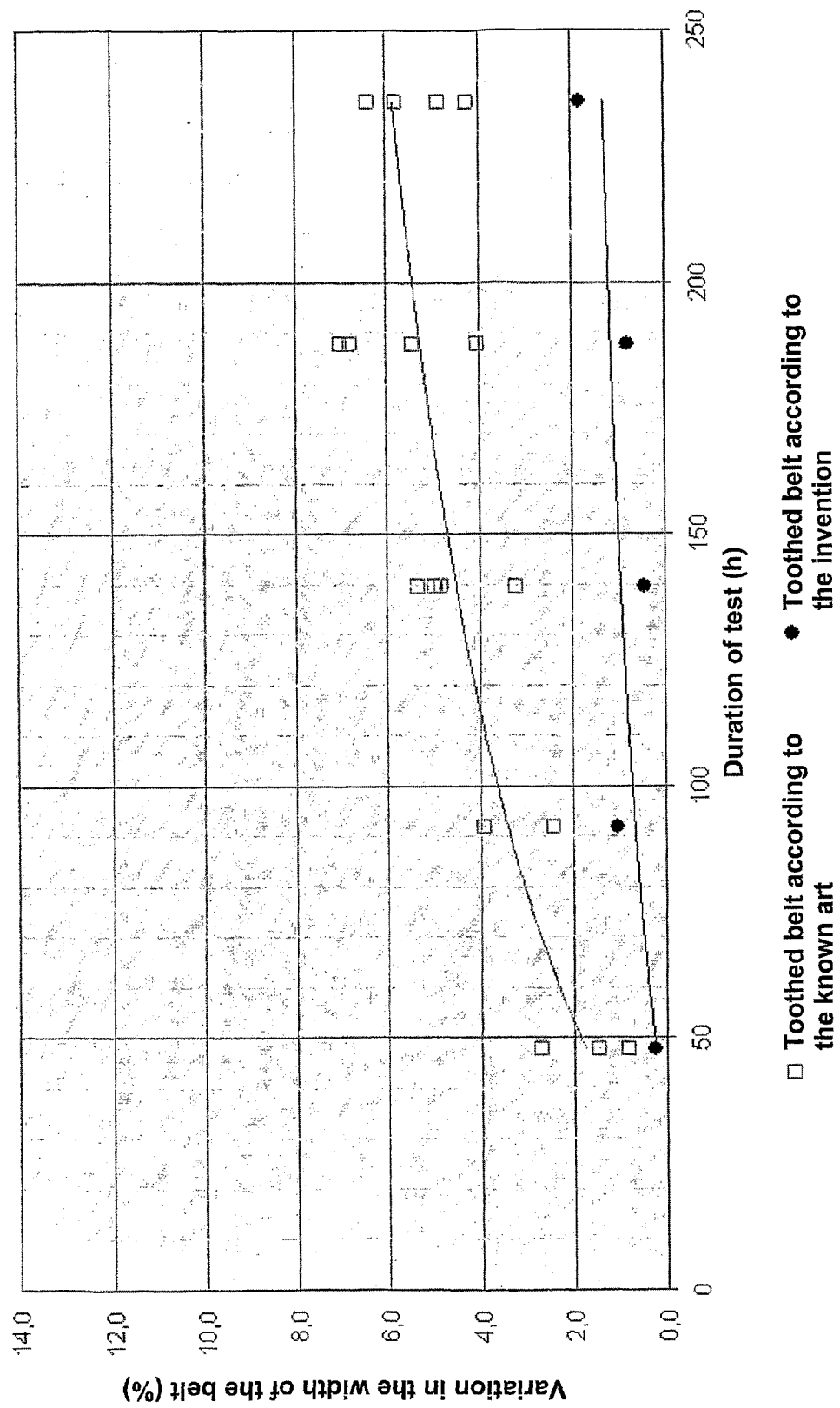
FIG. 6 is a diagram that shows the variation of the width of known belts and belts according to the present invention.

Surprisingly, the toothed belts according to the invention have a swelling due to reduced absorption of the fuel-mixed oil, but the mechanical properties remain optimal and are maintained good even after thermal aging in air, as may be noted in the diagram of FIG. 6 where the values obtained on several tests of toothed belts according to the present invention and according to the known art are compared.

Independently of the test used or of the drive system or of the various components that form the belt, a lower final broadening is obtained.

Optimal results for the drive systems in which the belt operates in direct contact with oil or partially immersed in oil have however been obtained in the case in which the toothed belt further comprises an HNBR body compound with 50% acrylonitrile units, as in the case of diagram 6.

Furthermore, in the case of this belt, optimal results are also obtained in virtue of the fact that the fabric has been treated with RFL and subsequently with a second treatment such as that disclosed in EP1157813, in which HNBR with 50% acrylonitrile units has been used as an elastomeric material.

Therefore this particular combination of materials forming the body compound and the fabric in combination with the fact the belts have a body compound comprising fibres extending in a direction substantially perpendicular to the resistant inserts and substantially parallel to a surface defined by the axes of the resistant inserts allows to obtain a longer average life of the belt than for known belts.

The invention claimed is:

1. A method for using a toothed belt in a drive system comprising:
   obtaining said toothed belt comprising alternating transverse teeth and grooves; and
   placing said toothed belt in direct contact with oil or partially immersing said toothed belt in oil, said toothed belt comprising a body made of a first elastomeric material, a toothing coated by a fabric and a plurality of longitudinal resistant inserts embedded in the body of the belt, wherein said first elastomeric material comprises fibres which extend in a direction. substantially perpendicular to said resistant inserts, substantially parallel to the orientation of the transverse teeth and grooves, and substantially parallel to a surface defined by the axes of said resistant inserts,
   wherein said fibres have a length in the range between 0.5 mm and 2 mm,
   wherein said toothed belt swells less than 2% of an initial width of said toothed belt from absorption of oil in a fuel-mixed oil after 200 hours of operation in said fuel-mixed oil, the fuel-mixed oil comprising a mixture of oil with fuel, wherein the fuel is more than 30% of the mixture, and
   wherein the fibres are distributed throughout the first elastomeric material from a back side of the toothed belt to the toothing of the toothed belt.

2. The method according to claim 1, wherein said fibres are present in said first elastomeric material in an amount in the range between 1 and 40 phr.

3. The method according to claim 2, wherein said fibres are present in said first elastomeric material in an amount in the range between 10 and 30 phr.

4. The method according to claim 1, wherein said fibres are selected from the group consisting of glass fibres, carbon fibres, polyamide fibres, aramidic fibres, polyester fibres, polyvinyl acetate fibres, PTFE, polyketone, PBO, PEEK, PPS, polyimides, cotton and mixtures thereof.

5. The method according to claim 1, wherein said fibres are adhered to said first elastomeric material.

6. The method according to claim 1, wherein said first elastomeric material is obtained from a diene monomer and a nitrile-group containing monomer.

7. The method according to claim 6, wherein said nitrile groups are in a percentage in the range between 34 and 53% in weight.

8. The method according to claim 6, wherein said nitrile groups are in a percentage in the range between 49 and 51% in weight.

9. The method according to claim 8, wherein said unsaturated carboxylic acid is methacrylic or acrylic acid and said salt is a zinc salt of methacrylic or acrylic acid.

10. The method according to claim 6, wherein said first elastomeric material comprises a polymer added with an unsaturated carboxylic acid and/or a salt of an unsaturated carboxylic acid.

11. The method according to claim 1, wherein said first elastomeric material is selected from the group consisting of NBR, HNBR, XHNBR or mixture thereof.

12. The method according to claim 1, wherein said fabric is subjected to a first treatment and to a second treatment, wherein at least one of said first and second treatments comprises a fluorinated plastomer.

13. The method according to claim 12, wherein said second treatment comprises a second elastomeric material comprising a mixture of one or more copolymers, obtained from a diene monomer and a nitrile group-containing monomer in which the nitrile group-containing monomers are in a percentage in the range between 49 and 53% in weight with respect to total final copolymers.

14. The method of claim 1, wherein said fibres have a diameter in the range between 0.1µm and 20 µm.

15. A timing control system for a motor vehicle comprising at least one drive pulley, a driven pulley, and a toothed belt comprising alternating transverse teeth and grooves and means adapted to maintain said toothed belt continuously in contact with oil over an operating life of said toothed belt, said toothed belt comprising;
   a body made of a first elastomeric material,
   a toothing coated by a fabric and a plurality of longitudinal resistant inserts embedded in the body of the belt,
   wherein said first elastomeric material comprises fibres which extend in a direction substantially perpendicular to said resistant inserts and substantially parallel to a surface defined by the axes of said resistant inserts,
   wherein said fibres have a length in the range between 0.5 mm and 2 mm,
   wherein said toothed belt swells less than 2% of an initial width of said toothed belt from absorption of oil in a fuel-mixed oil after 200 hours of operation in said fuel-mixed oil, the fuel-mixed oil comprising a mixture of oil with fuel, wherein the fuel is more than 30% of the mixture, and
   wherein the fibres are distributed throughout the first elastomeric material from a back side of said toothed belt to the toothing of said toothed belt.

16. The timing control system according to claim 15 comprising an engine block, wherein said toothed belt is positioned within said engine block.

17. A process for manufacturing a belt adapted to be maintained continuously in contact with oil, comprising a body made of a first elastomeric material, a toothing coated by a fabric and a plurality of longitudinal resistant inserts embedded in the body of the belt, wherein said first elastomeric material comprises fibres which extend in a direction substantially perpendicular to said resistent inserts and substantially parallel to a surface defined by the axes of said resistant inserts, the process comprising:
   cutting a strip of elastomeric material in portions along a first direction and
   subsequently joining said portions in a second direction perpendicular to the first direction so as to form a continuous strip;
   wherein said fibres have a length in the range between 0.5 mm and 2 mm,
   wherein said toothed belt swells less than 2% of an initial width of said toothed belt from absorption of oil in a fuel-mixed oil after 200 hours of operation in said fuel-mixed oil, the fuel-mixed oil comprising a mixture of oil with fuel, wherein the fuel is more than 30% of the mixture, and
   wherein the fibres are distributed throughout the first elastomeric material from a back side of the toothed belt to the toothing of the toothed belt.

\* \* \* \* \*